United States Patent
Morikuni (10) Patent No.: US 11,703,745 B2
(45) Date of Patent: Jul. 18, 2023

(54) OPTICAL DEVICE, PROJECTOR, AND IMAGING APPARATUS

(71) Applicant: SEIKO EPSON CORPORATION, Tokyo (JP)

(72) Inventor: Eiji Morikuni, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/475,508

(22) Filed: Sep. 15, 2021

(65) Prior Publication Data

US 2022/0082912 A1 Mar. 17, 2022

(30) Foreign Application Priority Data

Sep. 15, 2020 (JP) ................ 2020-154421

(51) Int. Cl.
| | |
|---|---|
| *G03B 21/00* | (2006.01) |
| *G03B 21/20* | (2006.01) |
| *G03B 21/28* | (2006.01) |
| *G03B 21/56* | (2006.01) |

(52) U.S. Cl.
CPC ....... *G03B 21/005* (2013.01); *G03B 21/2066* (2013.01); *G03B 21/28* (2013.01); *G03B 21/56* (2013.01)

(58) Field of Classification Search
CPC .. G03B 21/005; G03B 21/2066; G03B 21/56; G03B 21/28; G02B 13/16; G02B 7/102; G02B 9/64; G02B 17/0856; G02B 27/18
See application file for complete search history.

(56) References Cited

U.S. PATENT DOCUMENTS

| | | | |
|---|---|---|---|
| 7,048,388 B2* | 5/2006 | Takaura | G02B 17/0848 |
| | | | 353/77 |
| 7,549,755 B2 | 6/2009 | Suzuki | |
| 8,107,163 B2 | 1/2012 | Nishikawa | |
| 2004/0156117 A1 | 8/2004 | Takaura et al. | |
| 2006/0193036 A1 | 8/2006 | Suzuki | |
| 2008/0158439 A1 | 7/2008 | Nishikawa | |

(Continued)

FOREIGN PATENT DOCUMENTS

| | | |
|---|---|---|
| JP | 2004-246042 | 9/2004 |
| JP | 2006-235516 | 9/2006 |

(Continued)

*Primary Examiner* — Magda Cruz
(74) *Attorney, Agent, or Firm* — Dority & Manning, P.A.

(57) ABSTRACT

An optical device includes a first optical system having an optical element, a second optical system having a lens and disposed at a reduction side of the first optical system, a first holding member holding the optical device, a second holding member holding the lens, and a movement mechanism configured to move the first holding member in optical axis directions. The optical element has a reflection surface. The first holding member has a first holding portion holding the optical element and a first coupling portion extending from the first holding portion to a second optical system side. The movement mechanism has a transport mechanism configured to move the first coupling portion along the optical axis directions, and a guide mechanism configured to guide the first holding member in the optical axis directions. The guide mechanism restricts rotation of the first holding member around the optical axis.

15 Claims, 7 Drawing Sheets

(56) References Cited

U.S. PATENT DOCUMENTS

| | | | | |
|---|---|---|---|---|
| 2016/0370691 | A1* | 12/2016 | Takehana | G02B 7/04 |
| 2018/0017758 | A1* | 1/2018 | Takehana | G03B 21/147 |
| 2018/0046068 | A1* | 2/2018 | Hatano | G02B 15/144 |
| 2019/0011684 | A1 | 1/2019 | Ishihara et al. | |
| 2019/0137853 | A1* | 5/2019 | Takehana | G02B 7/04 |
| 2020/0278595 | A1* | 9/2020 | Yanagisawa | G02B 13/16 |
| 2021/0033829 | A1 | 2/2021 | Ishigame | |
| 2021/0232035 | A1* | 7/2021 | Yanagisawa | G02B 13/16 |
| 2022/0066296 | A1* | 3/2022 | Yanagisawa | G02B 17/086 |

FOREIGN PATENT DOCUMENTS

| | | |
|---|---|---|
| JP | 2007-316674 | 12/2007 |
| JP | 2008-116688 | 5/2008 |
| JP | 2008-242025 | 10/2008 |
| JP | 2009-229738 | 10/2009 |
| JP | 2017-156712 | 9/2017 |
| JP | 2017-156713 | 9/2017 |
| JP | 2017-156714 | 9/2017 |
| JP | 2019-133061 | 8/2019 |
| JP | 2020-042103 | 3/2020 |
| JP | 2020-194115 | 12/2020 |

* cited by examiner

OPTICAL DEVICE, PROJECTOR, AND IMAGING APPARATUS

The present application is based on, and claims priority from JP Application Serial Number 2020-154421, filed Sep. 15, 2020, the disclosure of which is hereby incorporated by reference herein in its entirety.

BACKGROUND

1. Technical Field

The present disclosure relates to an optical device, a projector, and an imaging apparatus.

2. Related Art

JP-A-2008-116688 discloses a projector that enlarges and projects a projection image formed by an image forming unit by a projection system. The projection system of JP-A-2008-116688 includes a first optical system and a second optical system sequentially from a reduction side toward an enlargement side. The first optical system is a refractive system including a plurality of lenses. The second optical system includes a mirror. The mirror has a larger outer diameter dimension than those of the respective lenses forming the first optical system. In JP-A-2008-116688, when a projection distance of the projector is changed, part of the plurality of lenses forming the first optical system and the second optical system are moved in optical axis directions.

In JP-A-2008-116688, an optical element including a reflection surface is moved relative to the refractive system. However, there is no specific description about a mechanism of moving the optical element including the reflection surface in the optical axis directions.

SUMMARY

An optical device according to an aspect of the present disclosure includes a first optical system having an optical element, a second optical system having a lens and disposed at a reduction side of the first optical system, a first holding member holding the optical element, a second holding member holding the lens, and a movement mechanism configured to move the first holding member in optical axis directions along an optical axis of the optical element. The optical element has a reflection surface. The first holding member has a first holding portion disposed at an enlargement side of the second optical system and holding the optical element, and a first coupling portion extending from the first holding portion to a second optical system side. The movement mechanism has a transport mechanism disposed at an outside in a radial direction of the second optical system and configured to move the first coupling portion along the optical axis directions, and a guide mechanism disposed at an outside in a radial direction of the first holding portion and configured to guide the first holding member in the optical axis directions. The guide mechanism restricts rotation of the first holding member around the optical axis.

A projector according to an aspect of the present disclosure includes a light modulator modulating light emitted from a light source, and the above described optical device projecting the light modulated by the light modulator.

An imaging apparatus according to an aspect of the present disclosure includes the above described optical device, and an imager disposed on a reduction-side conjugate plane on which light emitted from the optical device is imaged.

DESCRIPTION OF EXEMPLARY EMBODIMENTS

As below, an optical device, a projector, and an imaging apparatus according to embodiments of the present disclosure will be explained with reference to the drawings.

Projector

Figure 1:
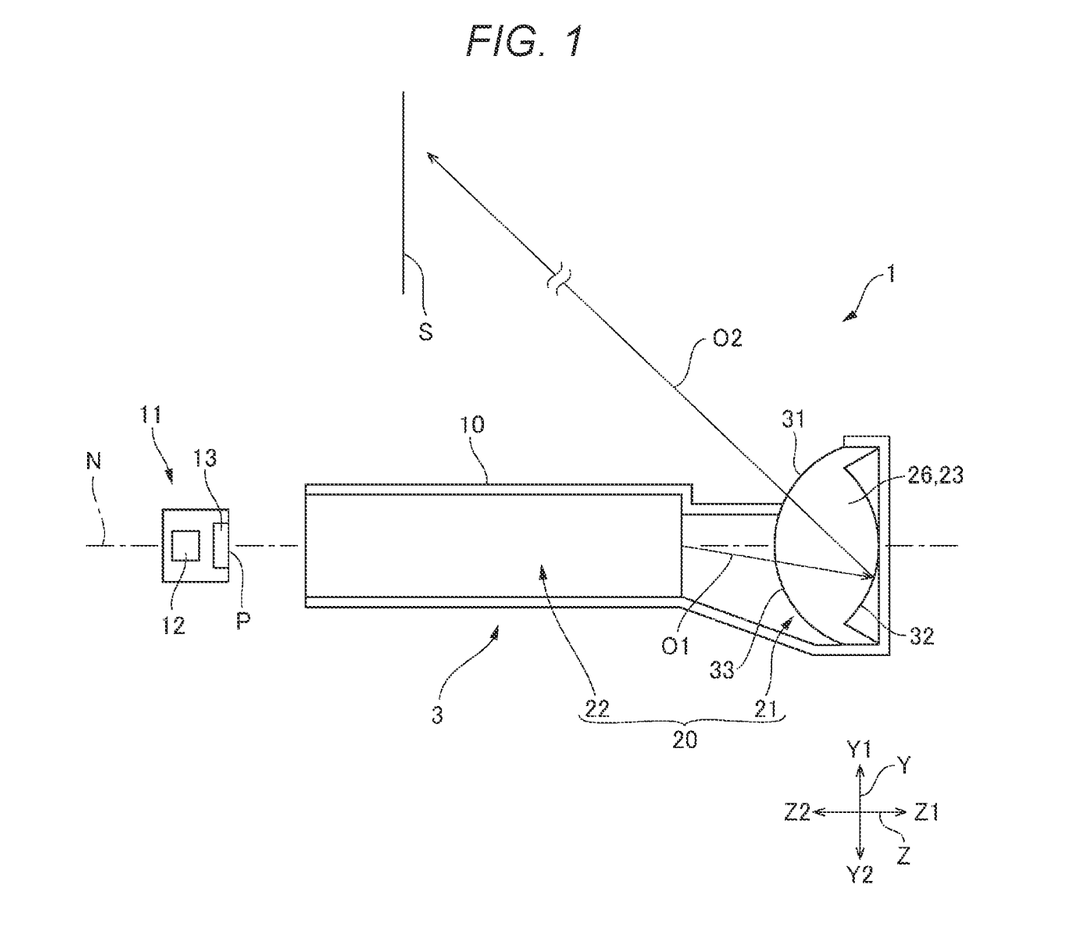
FIG. 1 is an explanatory diagram of a projector including an optical device according to the present disclosure.

FIG. 1 is an explanatory diagram of a projector 1. As shown in FIG. 1, the projector 1 includes an optical device 3 and an image forming unit 11. The optical device 3 includes a lens tube 10 and an optical system 20 housed in the lens tube 10. The image forming unit 11 forms a projection image on a reduction-side conjugate plane P of the optical system. The image forming unit 11 includes a light source 12 and a light modulator 13 that modulates a beam from the light source 12. The light modulator 13 modulates the beam from the light source 12 based on an image signal for formation of the projection image and forms the projection image on the reduction-side conjugate plane P. In this example, the light modulator 13 is a liquid crystal panel. That is, the projector 1 includes the light source 12, the light modulator 13 that modulates the light output from the light source 12, and the optical device 3 that projects the light modulated by the light modulator 13.

The optical system 20 includes a first optical system 21 and a second optical system 22 sequentially from an enlargement side toward a reduction side. The first optical system 21 includes a reflection surface 32 and reflects a beam O1 entering from the light modulator 13 via the second optical system 22 toward a side of the second optical system 22. Here, a screen is placed on an enlargement-side conjugate plane S of the projection system. A beam O2 reflected by the reflection surface 32 reaches the screen and forms an enlarged image on the screen.

In the following description, for convenience, three axes orthogonal to one another are referred to as "X-axis", "Y-axis", and "Z-axis". Z-axis directions are directions along a first optical axis N of the first optical system 21. In the Z-axis directions, a side at which the first optical system 21 is located is referred to as "first direction Z1" and a side at which the second optical system 22 is located is referred to as "second direction Z2". Further, the side at which the screen is located with respect to the first optical axis N is referred to as "upside" and the opposite side is referred to as "downside".

Optical Device of Example 1

Figure 2:
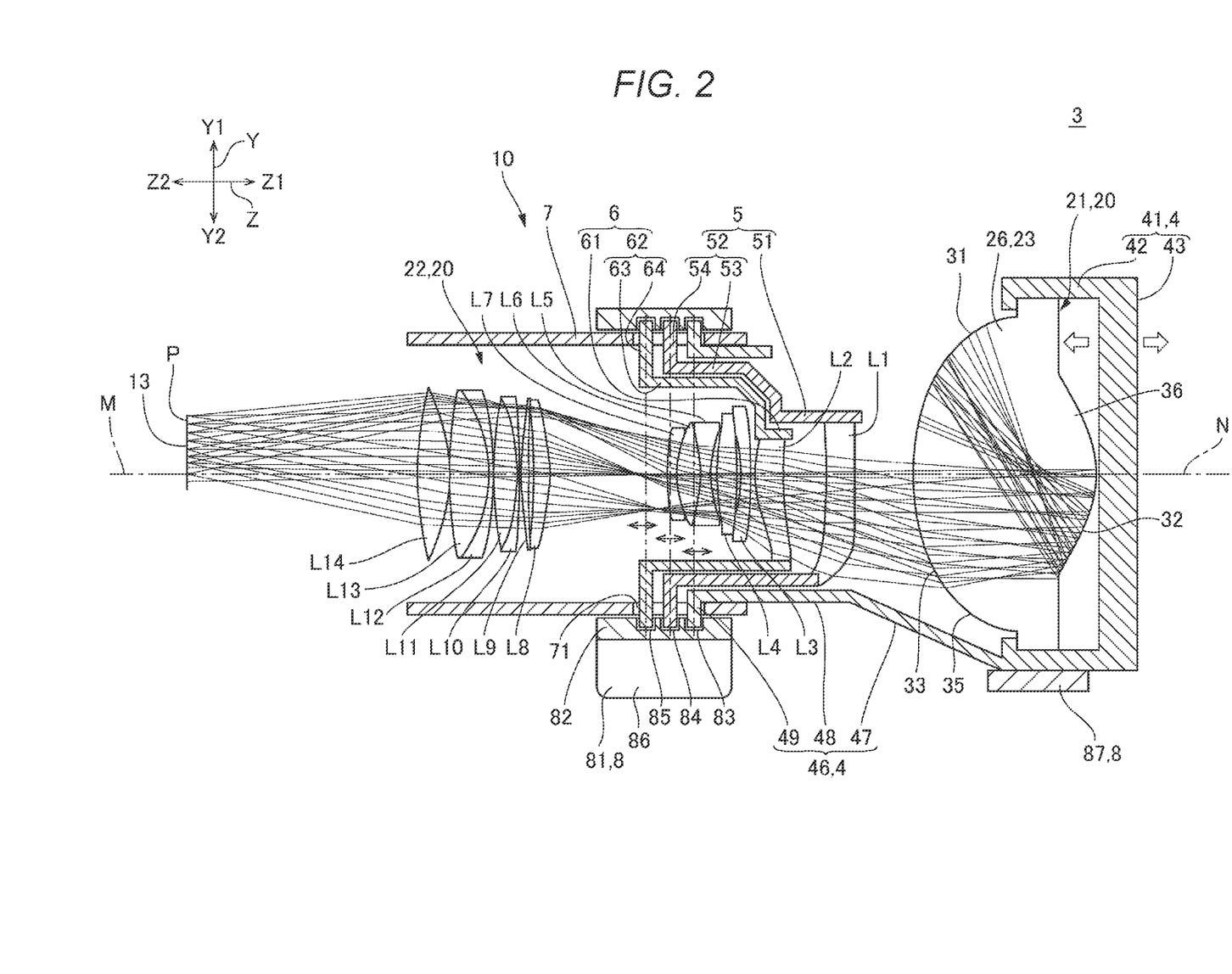
FIG. 2 is an explanatory diagram of an optical system and a lens tube of the optical device of Example 1.
Figure 3:
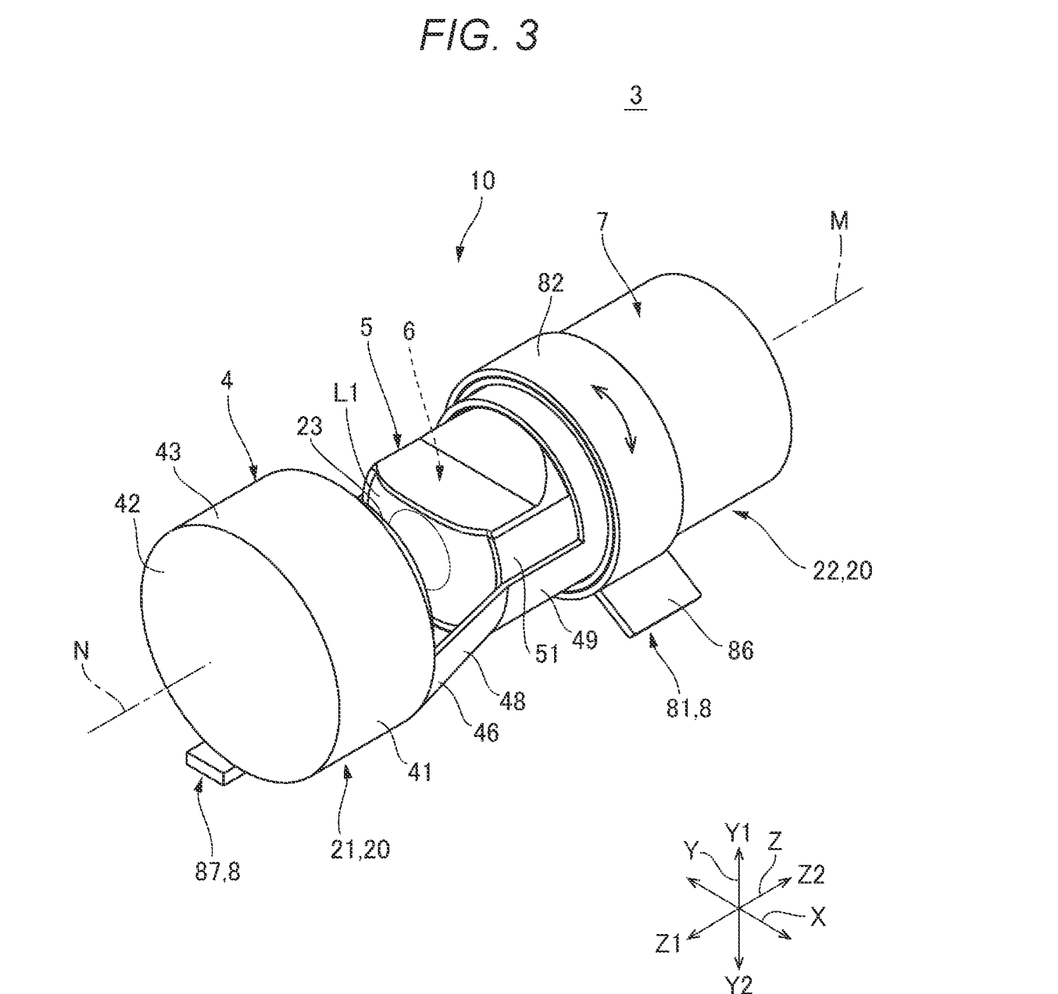
FIG. 3 is a perspective view of the optical device of Example 1.

FIG. 2 is an explanatory diagram of the optical system and the lens tube. In FIG. 2, regarding the lens tube 10, only a main part of a movement mechanism of moving an optical element and lenses is shown. FIG. 3 is a perspective view of the optical device.

Optical System

As shown in FIG. 2, the first optical system 21 includes one optical element 23. The second optical system 22 includes a plurality of lenses. The second optical system 22 is placed at the reduction side of the first optical system 21. The first optical axis N of the first optical system 21 is aligned with a second optical axis M of the second optical system.

The optical element 23 includes a lens 26 having a first face 35 facing the side of the second optical system 22 and a second face 36 facing the opposite side to the first face 35, and a reflection coating layer provided on the second face 36 of the lens 26. The lens 26 is formed using glass or resin. In this example, the lens 26 is formed using resin. The first face 35 and the second face 36 of the lens 26 have convex shapes. The first optical axis N of the first optical system 21 is an optical axis of the lens 26.

An area at an upside Y1 of the optical axis of the first face 35 is a first transmission surface 31 from which a beam is output toward the screen. The reflection surface 32 is provided in an area at a downside Y2 of the optical axis of the second face 36. The reflection surface 32 is the reflection coating layer. The surface shape of the second face 36 is transferred to the reflection surface 32. An area at the downside Y2 of the optical axis of the first face 35 is a second transmission surface 33 that a beam from the second optical system 22 enters. That is, the reflection surface 32 is placed at a reduction side of the first transmission surface 31 and the second transmission surface 33 is placed at a reduction side of the reflection surface 32. At least one of the first transmission surface 31, the reflection surface 32, and the second transmission surface 33 has an aspheric shape.

The second optical system 22 includes a lens L1 to a lens L14 sequentially from the enlargement side toward the reduction side. The outer diameter dimensions of the lens L1 to the lens L14 are smaller than the outer diameter dimension of the first optical system 21. In the lens L1 and the lens L2, portions located at the upside Y1 of the second optical axis M of the second optical system 22 are cut out. Thereby, the lens L1 and the lens L2 include planar portions on upper ends of the outer circumferential surfaces thereof. Here, the second optical system 22 is located inside of the optical element 23 as seen from first optical axis N directions.

Optical Paths of Optical System

The light modulator 13 of the image forming unit 11 is placed in a position offset to the upside Y1 relative to the second optical axis M on the reduction-side conjugate plane P. The beam from the light modulator 13 enters the second optical system 22 from the upside Y1 of the second optical axis M. The beam output from the second optical system 22 passes through the downside Y2 of the second optical axis M and enters the first optical system 21. Therefore, the beam from the second optical system 22 enters the second transmission surface 33 of the optical element 23. The beam entering the optical element 23 from the second transmission surface 33 is reflected by the reflection surface 32 and output from the first transmission surface 31 located at the upside Y1 of the first optical axis N. The beam output from the first transmission surface 31 travels toward the screen located at the upside Y1 of the first optical axis N.

Lens Tube

As shown in FIGS. 2 and 3, the lens tube 10 includes a first holding member 4 that holds the optical element 23, a second holding member 5 that holds the lens L1, a third holding member 6 that holds the lens L2, and a fixing member 7 in a cylindrical shape surrounding the lens L3 to the lens L14 from the outer circumference side. Further, the lens tube 10 has a movement mechanism 8 that moves the first holding member 4, the second holding member 5, and the third holding member 6 in the first optical axis N directions.

The first holding member 4 includes a first holding portion 41 that holds the optical element 23 at the enlargement side of the second optical system 22 and a first coupling portion 46 extending from the first holding portion 41 to the side of the second optical system 22. The first holding portion 41 includes a cylindrical part 42 surrounding the optical element 23 from the outer circumference side and a circular plate 43 closing an opening of the cylindrical part 42 in the first direction Z1. The first coupling portion 46 includes a tapered part 47 extending from the lower part of the cylindrical part 42 toward the second direction Z2 in the first optical axis N directions, a first tubular part 48 located in the second direction Z2 of the tapered part 47, and a first pin 49 (cam follower part) projecting from the first tubular part 48 outward in a radial direction. The tapered part 47 is coupled to the lower part of the first tubular part 48. The cylindrical part 42 and the first tubular part 48 are coaxial. The outer diameter dimension of the first tubular part 48 is smaller than the outer diameter dimension of the cylindrical part 42.

The second holding member 5 includes a second holding portion 51 that surrounds the lens L1 from the outer circumference side and a second coupling portion 52 extending from the second holding portion 51 in the second direction Z2. The second holding portion 51 is a frame-shaped part along the contour shape of the lens L1. The second coupling portion 52 includes a second tubular part 53 and a second pin 54 (cam follower part) projecting from an end part of the second tubular part 53 in the second direction Z2 outward in the radial direction. That is, the second coupling portion 52 extends from the second holding portion 51 along the optical axis directions and extends toward the outside in the radial direction of the lens L1. The upper part of the second tubular part 53 is larger in outer diameter dimension in a stepwise fashion toward the second direction Z2.

The third holding member 6 includes a third holding portion 61 that surrounds the lens L2 from the outer circumference side and a third coupling portion 62 extending from the third holding portion 61 in the second direction Z2. The third holding portion 61 is a frame-shaped part along the contour shape of the lens L2. The third coupling portion 62 includes a third tubular part 63 and a third pin 64 (cam follower part) projecting from an end part of the third tubular part 63 in the second direction Z2 outward in the radial direction. The upper part of the third tubular part 63 is larger in outer diameter dimension in a stepwise fashion toward the second direction Z2.

Here, the end part of the third tubular part 63 of the third holding member 6 in the second direction Z2, the end part of the second tubular part 53 of the second holding member 5 in the second direction Z2, and an end part of the first tubular part 48 of the first holding member 4 in the second direction Z2 overlap as seen from a direction orthogonal to the axial line. Further, the third tubular part 63 of the third holding member 6, the second tubular part 53 of the second holding member 5, and the first tubular part 48 of the first holding member 4 are sequentially placed from the inner circumference side toward the outer circumference side.

The fixing member 7 has an end part in the first direction Z1 at the outer circumference sides of the first tubular part 48 of the first holding member 4, the second tubular part 53 of the second holding member 5, and the third tubular part 63 of the third holding member 6. The fixing member 7 includes a guide groove 71 (guide portion) linearly extending in the first optical axis N directions in a part located at the outer circumference sides of the first tubular part 48, the second tubular part 53, and the third tubular part 63. The first pin 49, the second pin 54, and the third pin 64 are inserted into the guide groove 71. The first pin 49, the second pin 54, and the third pin 64 are located sequentially from the enlargement side toward the reduction side. There are gaps respectively between the first pin 49, the second pin 54, and the third pin 64.

The movement mechanism 8 includes a transport mechanism 81 that moves the first coupling portion 46, the second coupling portion 52, and the third coupling portion 62 in the first optical axis N directions at the outer side in the radial direction of the second optical system 22. Further, the movement mechanism 8 includes a guide mechanism 87 that guides the first holding member 4 in the first optical axis N directions at the outer side in the radial direction of the first holding portion 41.

The transport mechanism 81 includes a cam member 82 rotatably supported by an end part of the fixing member 7 in the first direction Z1, and a first cam portion 83, a second cam portion 84, and a third cam portion 85 provided in the cam member 82. The first pin 94 penetrating the guide groove 71 is inserted into the first cam portion 83. The second pin 54 penetrating the guide groove 71 is inserted into the second cam portion 84. The third pin 64 penetrating the guide groove 71 is inserted into the third cam portion 85. The first cam portion 83, the second cam portion 84, and the third cam portion 85 are respectively helical grooves inclined in circumferential directions toward the first optical axis N directions. Here, the transport mechanism 81 overlaps with the optical element 23 as seen from the first optical axis N directions. Further, an operation lever 86 (operation portion) projecting outward in the radial direction is provided in the cam member 82. The operation lever 86 is provided to project from a case portion (not shown) of the projector 1 housing the optical device 3.

The guide mechanism 87 restricts the rotation of the first holding member 4 around the first optical axis N. The guide mechanism 87 includes e.g. a guide rail. In this case, the guide mechanism 87 includes a convex portion projecting from the cylindrical part 42 outward in the radial direction and a groove portion with which the convex portion movably engages. The groove portion extends in the first optical axis N directions. The convex portion moves in the groove portion in the first optical axis N directions, and thereby, the guide mechanism 87 guides the first holding portion 41 in the first optical axis N directions.

Motion

According to the rotation of the cam member 82, the first pin 49 of the first coupling portion 46 slides the first cam portion 83. Further, the second pin 54 of the second coupling portion 52 slides the second cam portion 84. The third pin 64 of the third coupling portion 62 slides the third cam portion 85. Furthermore, the first pin 49, the second pin 54, and the third pin 64 are guided by the guide groove 71 in the first optical axis N directions. Therefore, when the cam member 82 is rotated, the first pin 49 moves in the first optical axis N directions. Thereby, the first holding member 4 moves in the first optical axis N directions, and the optical element 23 moves in the first optical axis N directions. Further, when the cam member 82 is rotated, the second pin 54 moves in the first optical axis N directions. Thereby, the second holding member 5 moves in the first optical axis N directions, and the lens L1 moves in the first optical axis N directions. Similarly, when the cam member 82 is rotated, the third pin 64 moves in the first optical axis N directions. Thereby, the third holding member 6 moves in the first optical axis N directions, and the lens L2 moves in the first optical axis N directions.

Functions and Effects

The optical device 3 of this example includes the first optical system 21 having the optical element 23 with the reflection surface 32, the second optical system 22 having the lens L1 and placed at the reduction side of the first optical system 21, the first holding member 4 holding the optical element 23, the second holding member 5 holding the lens L1, and the movement mechanism 8 moving the first holding member 4 in the first optical axis N directions along the first optical axis N of the optical element 23. The first holding member 4 has the first holding portion 41 that holds the optical element 23 placed at the enlargement side of the second optical system 22 and the first coupling portion 46 extending from the first holding portion 41 toward the side of the second optical system 22. The movement mechanism 8 has the transport mechanism 81 placed at the outside in the radial direction of the second holding member 5 and moving the first coupling portion 46 in the first optical axis N directions, and the guide mechanism 87 placed at the outside in the radial direction of the first holding member 4 and guiding the first holding member 4 in the first optical axis N directions. The guide mechanism 87 restricts the rotation of the first holding member 4 around the first optical axis N.

In the optical device 3 of this example, the optical element 23 with the reflection surface 32 is held by the first holding member 4. The first holding member 4 has the first holding portion 41 that holds the optical element 23 and the first coupling portion 46 extending from the first holding portion 41 toward the side of the second optical system 22. The movement mechanism 8 moves the first coupling portion 46 in the first optical axis N directions to move the optical element 23 in the first optical axis N directions. Here, the movement mechanism 8 has the guide mechanism 87 guiding the first holding member 4 in the first optical axis N directions at the outside in the radial direction of the first holding portion 41 holding the optical element 23. Therefore, the optical element 23 held by the first holding member 4 may be accurately moved along the first optical axis N. Further, the guide mechanism 87 restricts the rotation of the first holding member 4 around the first optical axis N. Therefore, when the optical element 23 is moved along the first optical axis N, the optical element 23 does not rotate. Thus, when the optical element 23 is moved along the first optical axis N, eccentricity of the reflection surface 32 may be prevented or suppressed. Further, the transport mechanism 81 is located at the outside in the radial direction of the second holding member 5. Therefore, compared to a case where both the guide mechanism 87 and the transport mechanism 81 are provided at the outside in the radial direction of the first holding member 4 holding the optical element 23, the first optical system 21 may be made smaller in the radial direction.

In this example, the transport mechanism 81 may have the cam member 82 rotatable around the first optical axis N and the first cam portion 83 provided in the cam member 82, and the first coupling portion 46 may slide the first cam portion 83. According to the configuration, the transport mechanism 81 may be easily formed.

In this example, the optical device 3 may include the fixing member 7 overlapping with the second holding member 5 as seen from the direction orthogonal to the first optical axis N, and the cam member 82 may be rotatably supported by the fixing member 7. According to the configuration, the cam member 82 may be rotatably placed at the outside in the radial direction of the second holding member 5. Therefore, the transport mechanism 81 may be provided at the outside in the radial direction of the second holding member 5.

In this example, the guide groove 71 guiding the first coupling portion 46 in the first optical axis N directions may be provided in the fixing member 7. According to the configuration, the movement of the first holding portion 41 in the first optical axis N directions may be guided by the guide mechanism 87 and the movement of the first coupling portion 46 in the first optical axis N directions may be guided by the guide groove 71. Therefore, the movement of the first holding member 4 in the first optical axis N directions is easier.

In this example, the second holding member 5 has the second holding portion 51 placed at the outside in the radial direction of the lens L1 and holding the lens L1, and the second coupling portion 52 extending from the second holding portion 51 in the first optical axis N directions and extending toward the outside in the radial direction of the lens L1. The movement mechanism 8 includes the second cam portion 84 provided in the cam member 82. The second coupling portion 52 may slide the second cam portion 84 and the guide groove 71 may guide the second coupling portion 52 in the first optical axis N directions. According to the configuration, when the cam member 82 is rotated around the first optical axis N, the second holding member 5 may be moved in the first optical axis N directions. Therefore, when the projection distance is changed, the cam member 82 is rotated, and thereby, both the optical element 23 of the first optical system 21 and the lens L1 of the second optical system 22 may be moved at a time.

In this example, the operation lever 86 projecting outward in the radial direction of the cam member 82 may be provided in the cam member 82. Therefore, the operation lever 86 is configured to project from the case in which the optical device 3 of the example is incorporated, and thereby, the cam member 82 may be easily rotated by operation of the operation lever 86.

In this example, the second optical system 22 may be located inside of the optical element 23 as seen from the first optical axis N directions and the transport mechanism 81 may overlap with the optical element 23 as seen from the optical axis directions. According to the configuration, upsizing of the optical device 3 in the radial direction may be suppressed.

In this example, the reflection surface 32 may be a concave curved surface. The first optical system 21 includes the reflection surface 32 of the concave curved surface, and thereby, the magnification factor of the optical system 20 including the first optical system 21 and the second optical system 22 may be easily increased.

In this example, the optical element 23 may have the first transmission surface 31, the reflection surface 32 placed at the reduction side of the first transmission surface 31, and the second transmission surface 33 placed at the reduction side of the reflection surface 32. According to the configuration, the beam passing through the optical element 23 can be refracted on the first transmission surface 31 and the second transmission surface 33. Accordingly, the magnification factor of the optical system 20 including the first optical system 21 and the second optical system 22 may be increased more easily. Therefore, for example, when the optical system 20 is set to a predetermined magnification factor, the optical element 23 includes the first transmission surface 31, the reflection surface 32, and the second transmission surface 33, and thereby, compared to a case where the optical element 23 includes only the reflection surface 32, the optical element 23 may be made smaller in the radial direction. Thus, upsizing of the optical device 3 in the radial direction may be suppressed.

In this example, the optical element 23 has the first face 35 facing the side of the second optical system 22, the second face 36 facing the opposite side to the first face 35, and the reflection coating layer provided on the second face 36. The first face 35 has the convex shape and the first transmission surface 31 and the second transmission surface 33 are provided on the first face 35. The reflection surface 32 may be the reflection coating layer and the surface shape of the second face 36 may be transferred thereto. According to the configuration, the first transmission surface 31, the reflection surface 32, and the second transmission surface 33 may be provided in the single optical element 23.

In this example, at least one of the first transmission surface 31, the reflection surface 32, and the second transmission surface 33 may have an aspherical shape. When moving in the first optical axis N directions, the rotation of the optical element 23 around the optical axis is restricted by the guide mechanism 87. Therefore, it is not necessary to form the first transmission surface 31, the reflection surface 32, and the second transmission surface 33 in rotationally symmetrical shapes around the axial line, and aspherical shapes are employed for these surfaces and the first face 35 and the second face 36 may be free-form curved surfaces. Here, the first transmission surface 31, the reflection surface 32, and the second transmission surface 33 are formed as aspherical shapes, and thereby, compared to a case where these surfaces have spherical shapes, aberration may be easily suppressed.

In the projector 1 of this example, when the projection distance is changed, the optical element 23, the lens L1, and the lens L2 of the optical device 3 may be respectively moved in the first optical axis N directions and focused.

Modified Example

Figure 4:
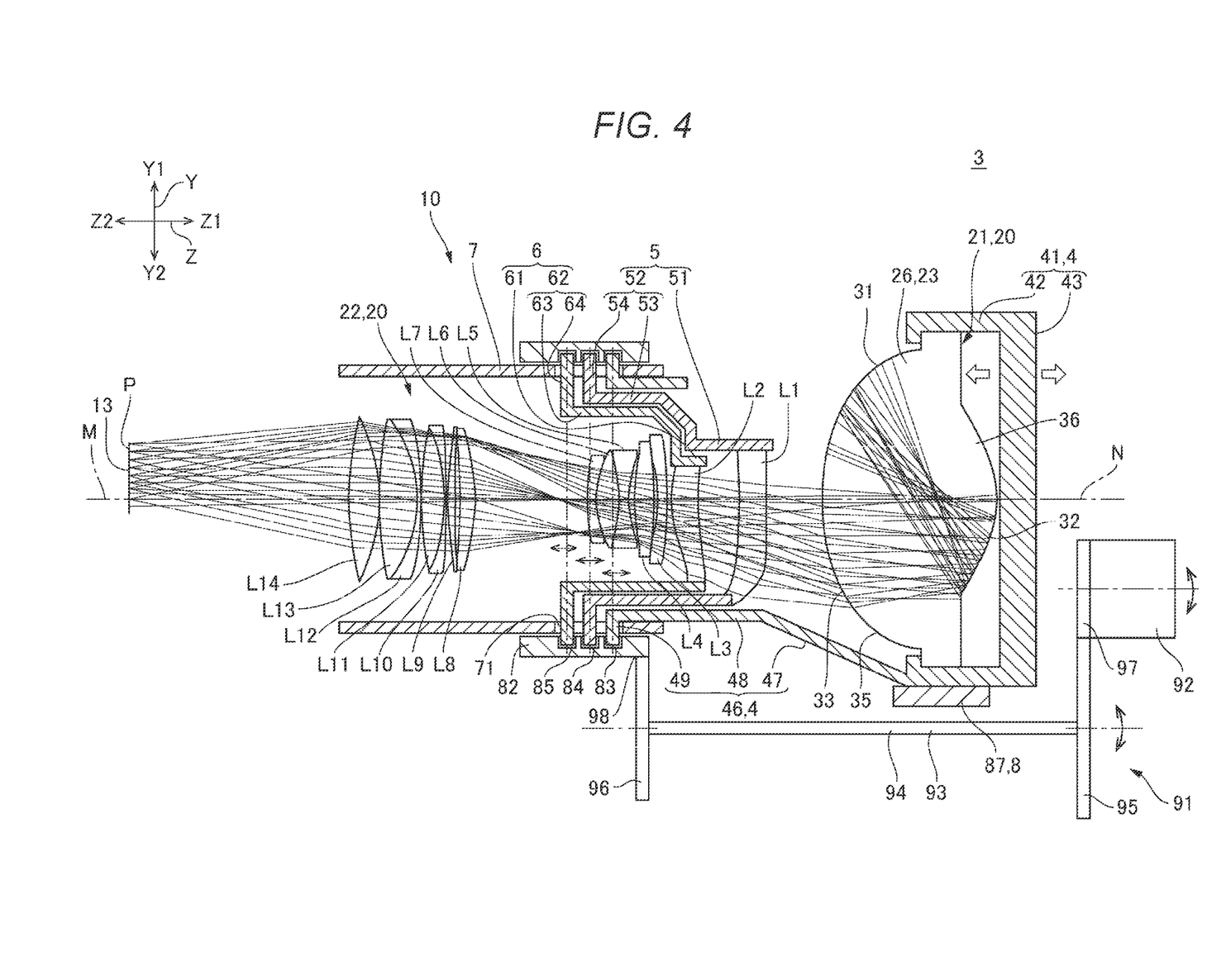
FIG. 4 is a ray diagram of an optical device of a modified example.

FIG. 4 is an explanatory diagram of the optical device 3 of a modified example. The optical device 3 of the modified example is different in the configuration of the transport mechanism 81 from the above described optical device 3, however, the rest of the configuration is the same. Accordingly, in the description of the optical device 3 of the modified example, the configurations corresponding to those of the above described optical device have the same signs and the explanation thereof will be omitted.

As shown in FIG. 4, in the optical device 3 of this example, the transport mechanism 81 includes an operation mechanism 91 for rotating the cam member 82. The operation mechanism 91 includes a rotating member 92 placed at the side of the first optical system 21 opposite to the second optical system 22 in the first optical axis N directions, and a rotation transmission mechanism 93 that transmits the rotation of the rotating member 92 to the cam member 82. The rotating member 92 is rotatably supported by an attachment plate (not shown). The rotation transmission mechanism 93 includes a shaft portion 94 and gear portions 95, 96 provided on both ends of the shaft portion 94. The gear portion 95 meshes with a gear portion 97 formed on the outer circumferential surface of the rotating member 92. The gear portion 96 meshes with a gear portion 98 formed on the outer circumferential surface of the cam member 82. Accordingly, the rotating member 92 is rotated, and thereby, the cam member 82 may be rotated. According to the configuration, the operation to move the first optical system 21 in the first optical axis N directions may be performed by the rotating member 92 placed at the side of the first optical system 21 opposite to the second optical system 22.

Optical Device of Example 2

Figure 5:
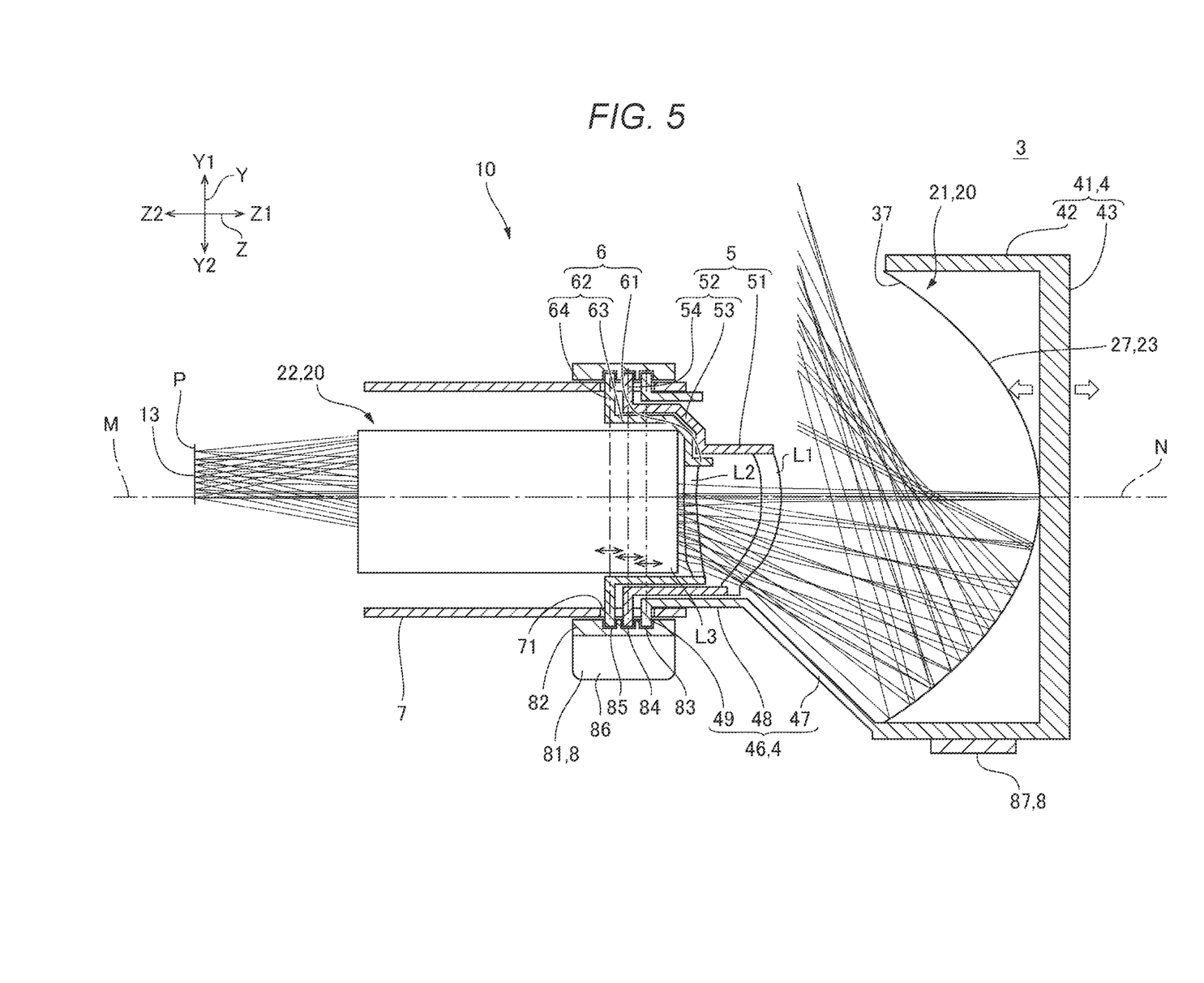
FIG. 5 is an explanatory diagram of an optical system and a lens tube of an optical device of Example 2.

FIG. 5 is an explanatory diagram of the optical system 20 and the lens tube 10 of the optical device 3 of Example 2. The optical device 3 of Example 2 includes a concave mirror 27 as the optical element 23 of the first optical system 21. Here, the optical device 3 of Example 2 has the same configuration as the above described optical device 3 except the optical element 23 of the first optical system 21. Therefore, the corresponding configurations have the same signs and the explanation thereof will be omitted. Further, in FIG. 5, part of the lens configuration of the second optical system 22 is omitted.

The first optical axis N of the first optical system 21 is an optical axis of the concave mirror 27. The optical axis of the concave mirror 27 passes through the center of the concave mirror 27. In the concave mirror 27, a reflection surface 37 reflecting the beam from the second optical system 22 toward the screen is provided in an area at the downside of the first optical axis N. The reflection surface 37 has an aspherical shape. Also, in this example, the same functions and effects as those of the optical device 3 of Example 1 may be obtained.

Optical Device of Example 3

Figure 6:
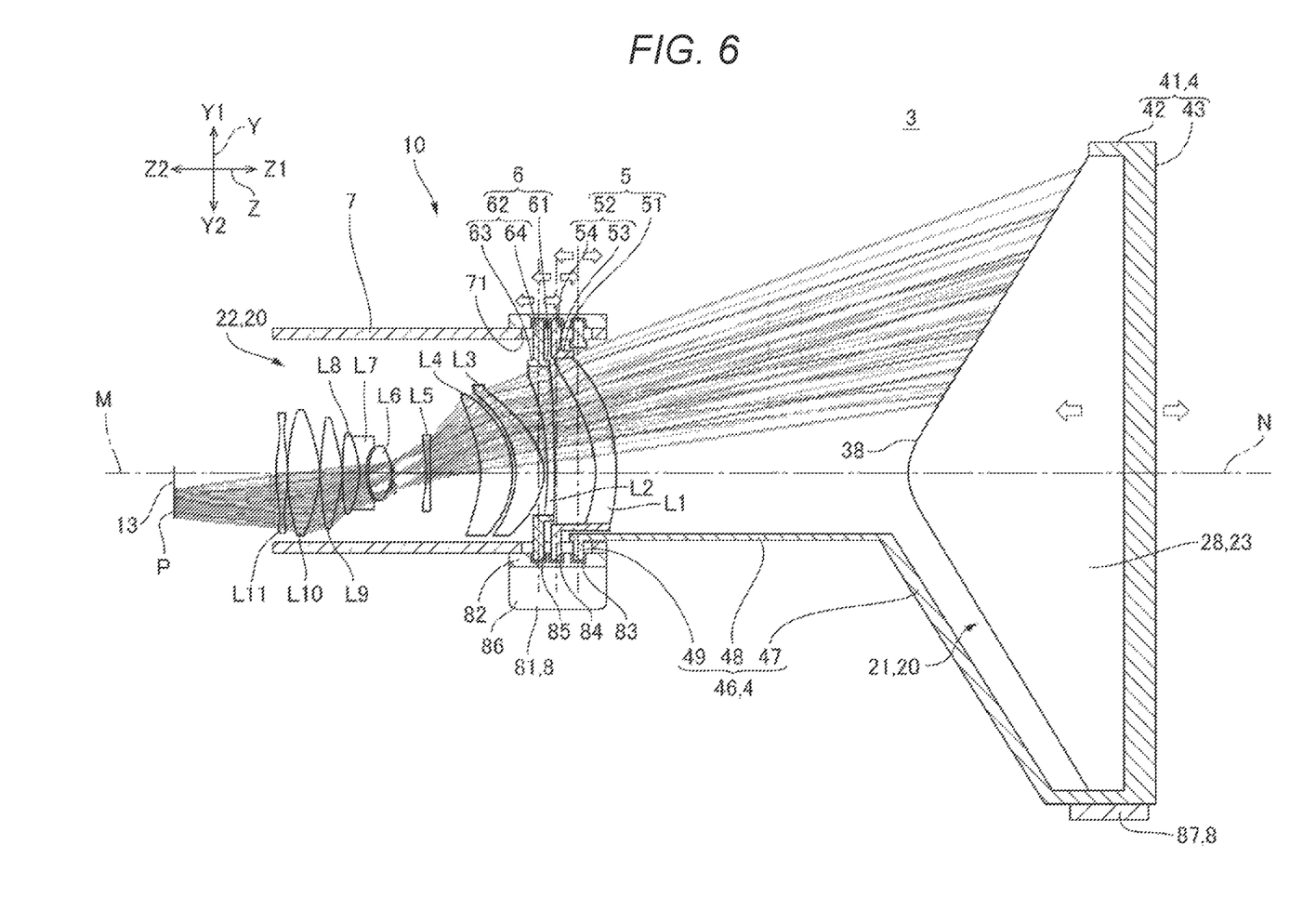
FIG. 6 is an explanatory diagram of an optical system and a lens tube of an optical device of Example 3.

FIG. 6 is an explanatory diagram of the optical system 20 and the lens tube 10 of the optical device 3 of Example 3. In the optical device 3 of Example 3, the optical element 23 of the first optical system 21 includes a convex mirror 28 as a convex curved surface toward the side of the second optical system 22. Here, the optical device of Example 3 has the same configuration as the above described optical device 3 except the optical element 23 of the first optical system 21. Therefore, the corresponding configurations have the same signs and the explanation thereof will be omitted.

The optical element 23 has a rotationally symmetrical shape with respect to the first optical axis N. Accordingly, the optical axis of the optical element 23 passes through the center of the convex mirror 28. In the convex mirror 28, a reflection surface 38 reflecting the beam from the second optical system 22 toward the screen is provided in an area at the upside of the first optical axis N. Also, in this example, the same functions and effects as those of the optical device 3 of Example 1 may be obtained.

Imaging Apparatus

Figure 7:
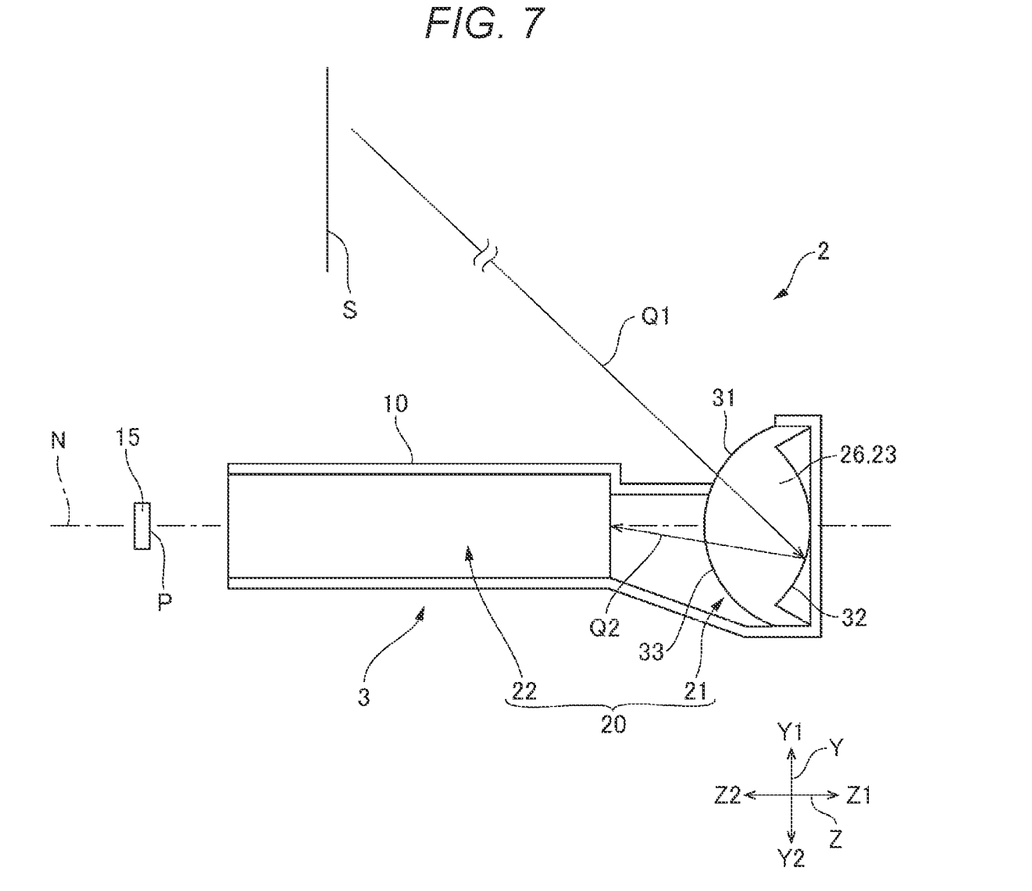
FIG. 7 is an explanatory diagram of an imaging apparatus including the optical device according to the present disclosure.

Here, the above described optical device 3 may be used as the optical device 3 of an imaging apparatus 2. FIG. 7 is an explanatory diagram of the imaging apparatus 2 including the optical device 3 of this example. The imaging apparatus 2 includes the optical device 3 having the optical system 20 and an imager 15 placed on the reduction-side conjugate plane P of the optical system 20. In this case, a beam Q1 from the enlargement-side conjugate plane S enters the second transmission surface 33 located on the first face 35 of the optical element 23 at the upside Y1 of the first optical axis N. The beam entering the second transmission surface 33 is reflected by the reflection surface 32 located at the downside Y2 of the first optical axis N. A beam Q2 reflected by the reflection surface 32 is output from the first transmission surface 31 located at the downside Y2 of the first optical axis N and travels to the first optical system 21. The beam entering the first optical system 21 is imaged on the imager 15 placed on the reduction-side conjugate plane P. Even when the above described optical device 3 is used for the imaging apparatus 2, the same functions and effects as those of the case using the above described optical device 3 for the projector 1 may be obtained.

In the second optical system 22 of the optical devices 3 of the above described examples and modified example, two lenses of the lens L1 and the lens L2 are movable along the first optical axis N, however, the configuration is not limited to that. For example, a single lens may be movable along the first optical axis N or three or more lenses may be movable along the first optical axis N. Further, a plurality of lenses may be movable in the same direction along the first optical axis N or in different directions.

What is claimed is:

1. An optical device comprising:
a first optical system having an optical element;
a second optical system having a lens and disposed at a reduction side of the first optical system;
a first holding member holding the optical device;
a second holding member holding the lens; and
a movement mechanism configured to move the first holding member in optical axis directions along an optical axis of the optical element, wherein
the optical element has a reflection surface,
the first holding member has a first holding portion disposed at an enlargement side of the second optical system and holding the optical element, and a first coupling portion extending from the first holding portion to a second optical system side,
the movement mechanism has a transport mechanism disposed at an outside in a radial direction of the second optical system and configured to move the first coupling portion along the optical axis directions, and a guide mechanism disposed at an outside in a radial direction of the first holding portion and configured to guide the first holding member in the optical axis directions,
the transport mechanism has a cam member rotatable around the optical axis and a first cam portion provided in the cam member, wherein when the cam member is rotated a first pin moves the first holding member in a first optical axis direction and the optical element in the first optical axis direction; and
the guide mechanism restricts rotation of the first holding member around the optical axis.

2. The optical device according to claim 1, wherein the first coupling portion slides the first cam portion.

3. The optical device according to claim 2, further comprising
a fixing member overlapping with the second holding member when viewed from a direction orthogonal to the optical axis, wherein
the cam member is rotatably supported by the fixing member.

4. The optical device according to claim 3, wherein
a guide portion is provided in the fixing member, the guide portion being configured to guide the first coupling portion in the optical axis directions.

5. The optical device according to claim 4, wherein
the second holding member includes a second holding portion disposed at an outside in a radial direction of the lens and holding the lens, and a second coupling portion extending from the second holding portion in the optical axis directions and extending to the outside in the radial direction of the lens,
the movement mechanism has a second cam portion provided in the cam member,
the second coupling portion slides the second cam portion, and
the guide portion guides the second coupling portion in the optical axis directions.

6. The optical device according to claim 2, wherein
an operation portion is provided in the cam member, the operation portion projecting to an outside in a radial direction of the cam member.

7. The optical device according to claim 2, wherein
the transport mechanism has an operation mechanism rotating the cam member, and
the operation mechanism has a rotating member disposed at an opposite side to the second optical system with respect to the first optical system in the optical axis directions, and a rotation transmission mechanism configured to transmit rotation of the rotating member to the cam member.

8. The optical device according to claim 1, wherein
the second optical system is located inside of the optical element when viewed from the optical axis directions, and
the transport mechanism overlaps with the optical element when viewed from the optical axis directions.

9. The optical device according to claim 1, wherein
the reflection surface is a concave curved surface.

10. The optical device according to claim 9, wherein
the optical element has a first transmission surface, the reflection surface disposed at the reduction side of the first transmission surface, and a second transmission surface disposed at the reduction side of the reflection surface.

11. The optical device according to claim 10, wherein
the optical element has a first face facing the second optical system side, a second face facing an opposite side to the first face, and a reflection coating layer provided on the second face,
the second face has a convex shape,
the first transmission surface and the second transmission surface are provided on the first face, and
the reflection surface is the reflection coating layer and a surface shape of the second face is transferred thereto.

12. The optical device according to claim 10, wherein
at least one of the first transmission surface, the reflection surface, and the second transmission surface has an aspherical shape.

13. The optical device according to claim 1, wherein
the reflection surface is a convex curved surface.

14. A projector comprising:
a light modulator modulating light emitted from a light source; and
the optical device according to claim 1, projecting the light modulated by the light modulator.

15. An imaging apparatus comprising:
the optical device according to claim 1; and
an imager disposed on a reduction-side conjugate plane on which light emitted from the optical device is imaged.

* * * * *